United States Patent
Kiyomoto et al.

(10) Patent No.: US 7,003,315 B2
(45) Date of Patent: Feb. 21, 2006

(54) MOBILE TERMINAL APPARATUS AND SYSTEM SELECTING METHOD

(75) Inventors: Moriaki Kiyomoto, Kokubunji (JP); Akira Ishikura, Kawasaki (JP); Takashi Sakagawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 451 days.

(21) Appl. No.: 10/241,566

(22) Filed: Sep. 12, 2002

(65) Prior Publication Data

US 2003/0069037 A1      Apr. 10, 2003

(30) Foreign Application Priority Data

Oct. 5, 2001      (JP)      .............................. 2001-310313

(51) Int. Cl.
     *H04B 1/38*      (2006.01)
(52) U.S. Cl. ............................... 455/552.1; 455/226.1; 455/67.11; 455/435.1
(58) Field of Classification Search ................ 455/552, 455/450, 513, 553, 437, 226.1, 552.1, 67.11, 455/435.1; 370/50, 95.1, 95.3, 335, 441, 370/332
     See application file for complete search history.

(56) References Cited

U.S. PATENT DOCUMENTS

| | | | |
|---|---|---|---|
| 6,058,316 A | 5/2000 | Takahashi | |
| 6,353,602 B1 * | 3/2002 | Cheng et al. | 370/332 |
| 2003/0017842 A1 * | 1/2003 | Moles et al. | 455/552 |

FOREIGN PATENT DOCUMENTS

JP      11-220430      8/1999

OTHER PUBLICATIONS

Canadian Office Action issued by the Canadian Patent Office on Dec. 22, 2004.

* cited by examiner

*Primary Examiner*—Erika A. Gary
*Assistant Examiner*—Wayne Cai
(74) *Attorney, Agent, or Firm*—Finnegan, Henderson, Farabow, Garrett & Dunner, L.L.P.

(57) ABSTRACT

In a first standby state, the reception quality of a signal from a system which has established synchronization is detected. If the detected reception quality deteriorates to be less than a threshold value, the destination of synchronization establishment is changed from a first system to a second system. In a second standby state after this system change, the reception quality of a system having a higher priority order of selection than the second system which has established synchronization is detected. If a third system whose detected reception quality exceeds the threshold value is found, the destination of synchronization establishment is changed to this third system again. After that, the first standby state is returned.

4 Claims, 7 Drawing Sheets

MOBILE TERMINAL APPARATUS AND SYSTEM SELECTING METHOD

CROSS-REFERENCE TO RELATED APPLICATIONS

This application is based upon and claims the benefit of priority from the prior Japanese Patent Application No. 2001-310313, filed Oct. 5, 2001, the entire contents of which are incorporated herein by reference.

BACKGROUND OF THE INVENTION

1. Field of the Invention

The present invention relates to a mobile terminal apparatus used in an area in which services are provided by a plurality of cellular mobile communication systems different in communication standards, e.g., a digital cell phone system, analog cell phone system, and PCS (Personal Communication System), and to a system selecting method used to select an optimum system while this mobile terminal apparatus is in a standby state.

2. Description of the Related Art

Generally, when a mobile terminal apparatus used in a cellular mobile communication system is powered on, the apparatus searches for a control signal transmitted by a base station of a system desired by the user, on the basis of a list registered beforehand. The mobile terminal apparatus then performs processing for establishing synchronization with the base station transmitting the control signal acquired by the search. When this synchronization is established, the mobile terminal apparatus proceeds to a standby state. Once the apparatus proceeds to this standby state, no effective messages from the base station can be received over a predetermined period after that. The mobile terminal apparatus holds this synchronization established state with respect to the desired system until a "system lost" condition occurs or speech or data communication once started is terminated.

With this configuration, however, if the reception quality deteriorates in the standby state, this deteriorated reception quality state continues until the "system lost" condition occurs or communication once started is terminated. In this case, if, among peripheral base stations which belong to the same system as the base station which has established the synchronization, there is a peripheral base station having higher reception quality than that of the former base station, idle handoff is performed for the latter base station. This can improve the reception quality. However, if there is no peripheral base station which belongs to the same system as the base station which has established the synchronization, or if no high-quality signals can be received from a peripheral base station which belongs to the same system, no idle handoff can be performed. Accordingly, the mobile communication terminal apparatus in a situation like this keeps standing by with the deteriorated reception quality. This sometimes interferes with connection control for an outgoing call or incoming call.

BRIEF SUMMARY OF THE INVENTION

The present invention has been made in consideration of the above situation, and has as its object to provide a mobile terminal apparatus capable of rapidly eliminating deterioration of the reception quality even if idle handoff cannot be performed between base stations in the same system while the apparatus is in a standby state, and a system selecting method of the apparatus.

To achieve the above object, the present invention provides a mobile terminal apparatus capable of connecting to a plurality of mobile communication systems having different communication standards, comprising a system acquiring section configured to acquire a first system from the plurality of mobile communication systems, and proceed to a first standby state, a first determination section configured to, in the first standby state, detect the reception quality of a signal transmitted from the first system, and check whether the detected reception quality satisfies a first condition, and a first system reacquiring section configured to, if the first determination section determines that the detected reception quality does not satisfy the first condition, acquire from the plurality of mobile communication systems a second system whose reception quality satisfies a second condition, and proceed to a second standby state. The apparatus further comprises a second determination section configured to, in the second standby state, detect the reception quality of a signal transmitted from a system except for the second system, and check whether there is a system whose detected reception quality satisfies a third condition, and a second system reacquiring section configured to, if the second determination section determines that there is a system whose detected reception quality satisfies the third condition, acquire the system meeting the third condition and return to the first standby state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION (First Embodiment)

Figure 1:
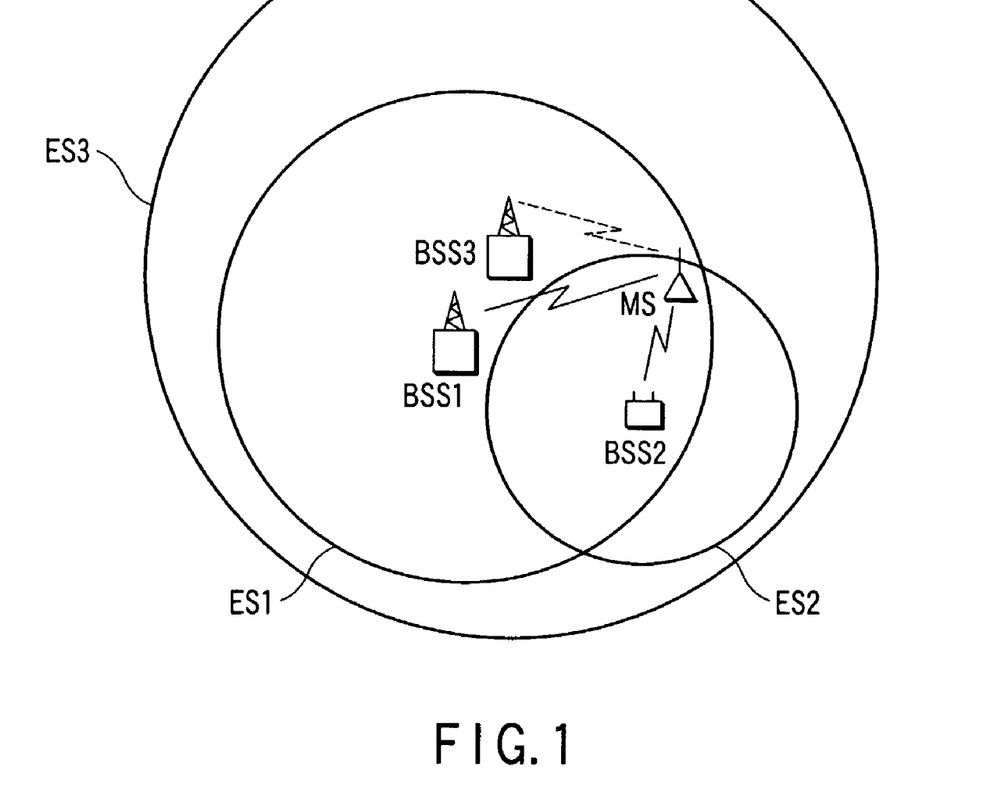
FIG. 1 is a schematic view showing the state of a service area in which a mobile communication terminal apparatus according to a first embodiment of the present invention is used.
Figure 3:
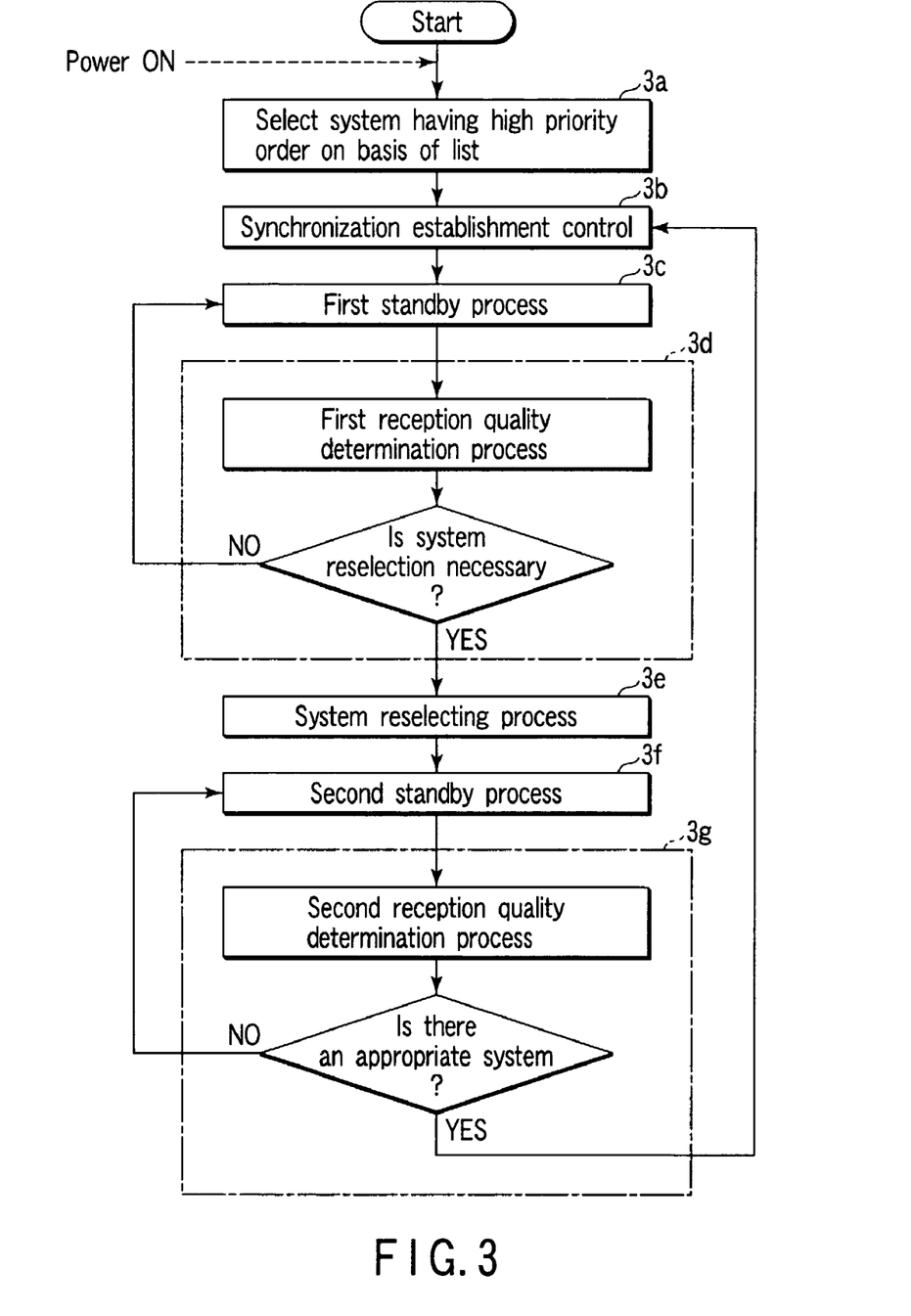
FIG. 3 is a flowchart showing the procedure and contents of system selection control performed by the mobile communication terminal apparatus shown in FIG. 2.

FIG. 1 is a schematic view showing the state of a service area in which a mobile communication terminal apparatus according to a first embodiment of the present invention is used. In this service area, a plurality of systems (three systems are shown in FIG. 3) operated independently of each other form radio areas ES1, ES2, and ES3. Base stations BSS1, BSS2, and BSS3 are installed in radio areas ES1, ES2, and ES3, respectively, and are connected to mobile communication switching apparatuses (not shown) operated by the individual systems.

Examples of the plurality of systems are a digital portable communication system using CDMA (Code Division Multiple Access) scheme, a personal mobile communication system called PCS (Personal Communication System) using the same CDMA scheme, and an analog cell phone system using an analog communication system represented by AMPS (Advanced Mobile Phone System).

For the sake of convenience of explanation, each system has one radio area, i.e., the radio area ES1, ES2, or ES3 shown in FIG. 1. In practice, however, a plurality of radio areas are formed in each system, and a base station is installed in each of these radio areas.

Figure 2:
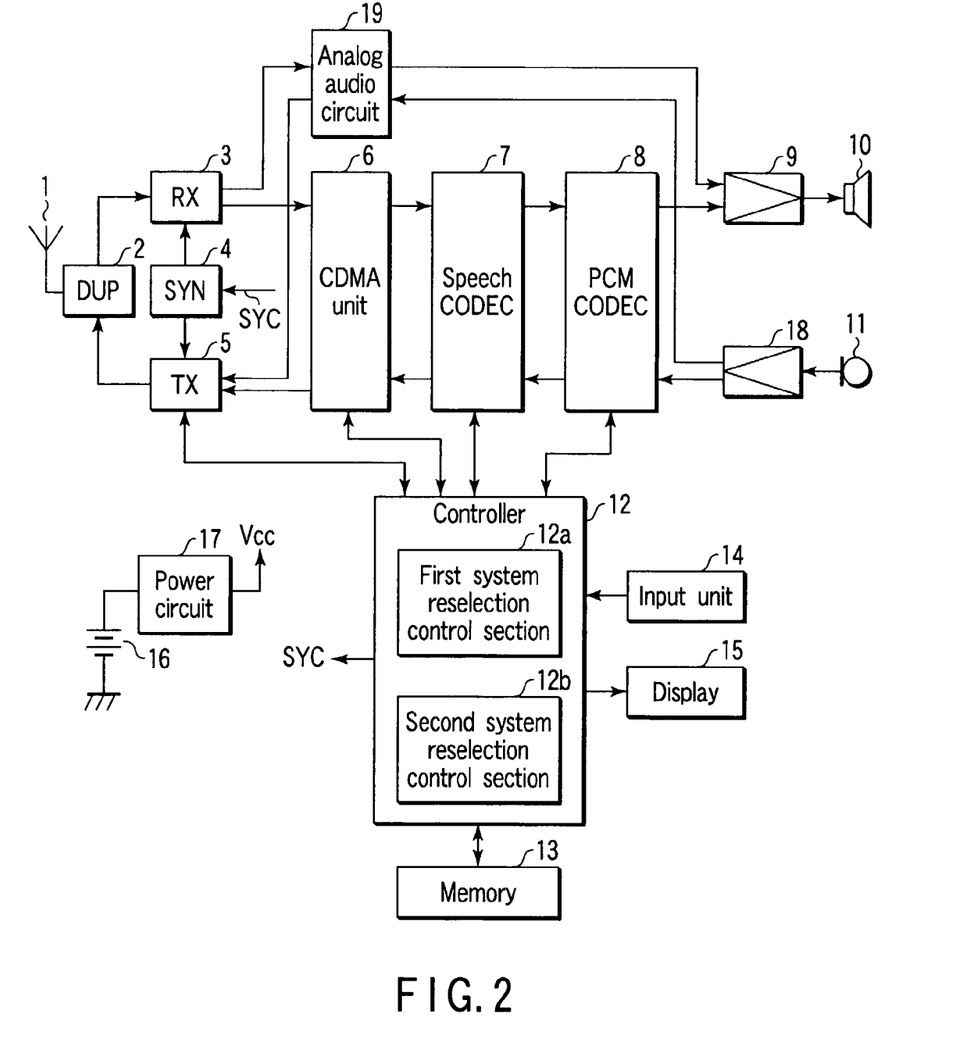
FIG. 2 is a block diagram showing the functional configuration of the mobile communication terminal apparatus according to the first embodiment of the present invention.

FIG. 2 is a block diagram showing the functional configuration of the mobile communication terminal apparatus according to the first embodiment of the present invention. This mobile communication terminal apparatus is a multi-mode terminal capable of communication by selectively using a digital mode which uses CDMA and an analog mode which uses AMPS.

A radio signal transmitted from the base station BSS1, BSS2, or BSS3 is received by an antenna 1 and input to a receiving circuit (RX) 3 via an antenna duplexer (DUP) 2. The receiving circuit 3 mixes the radio signal with a receive local oscillator signal output from a frequency synthesizer (SYN) 4, thereby down-converting the signal to an intermediate-frequency signal or baseband signal. Note that the frequency of the receive local oscillator signal generated by the frequency synthesizer 4 is designated by an output control signal SYC from a controller 12.

The received intermediate-frequency or baseband signal is input to a CDMA signal processing unit 6 when digital mode is set as a communication mode, or to an analog audio circuit 19 when analog mode is set.

For the input received intermediate-frequency or baseband signal, the CDMA signal processing unit 6 performs orthogonal demodulation and despreading using a spreading code (PN code) assigned to the receiving channel, thereby obtaining demodulated data. This demodulated data is input to a speech codec 7. A signal indicating the reception data rate of the demodulated data is input to the controller 12.

The speech codec 7 first expands the demodulated data output from the CDMA signal processing unit 6. This expansion process is performed in accordance with the reception data rate notified by the controller 12. The speech codec 7 then performs a decoding process using Viterbi decoding and an error correction decoding process. By these decoding processes, received digital data of the baseband is reproduced.

A PCM codec 8 performs signal processing in accordance with the type (speech communication or data communication) of communication mode. This communication mode type is designated by the controller 12. In speech communication mode, PCM decoding is performed for the received digital data output from the speech codec 7, and an analog reception speech signal is output. This analog reception speech signal is amplified by a receiver amplifier 9 and output as speech from a loudspeaker 10. In data communication mode, the received digital data output from the speech codec 7 is input to the controller 12. The controller 12 stores this input received digital data in a memory 13 and at the same time displays the data on a display 15. If necessary, the controller 12 outputs the received digital data from an external interface to a portable information terminal (PDA: Personal Digital Assistant) or a personal computer such as a notebook personal computer (neither is shown).

The analog audio circuit 19 performs analog demodulation for the input received intermediate-frequency signal by using an FM detector or the like, thereby reproducing an analog reception signal. This analog reception signal is amplified by the receiver amplifier 9 and output as speech from the loudspeaker 10.

An analog transmission speech signal output from a microphone 11 in speech communication mode is amplified to an appropriate level by a transmitter amplifier 18. This amplified analog transmission speech signal is input to the PCM codec 8 when digital mode is selected as this speech communication mode, or to the analog audio circuit 19 when analog mode is selected.

The PCM codec 8 performs PCM encoding for the input analog transmission speech signal. The generated transmission speech data is input to the speech codec 7.

This speech codec 7 changes its processing in accordance with whether speech communication mode or data communication mode is set. In speech communication mode, the amount of energy of the input speech is detected from the input transmission speech data. On the basis of the detection result, the transmission data rate is determined. On the basis of this determined transmission data rate, the input transmission speech data is compressed. The compressed transmission speech data is subjected to error correction encoding and input to the CDMA signal processing unit 6. In digital communication mode, output transmission data from the controller 12 is compressed in accordance with the preset transmission data rate. The compressed data is subjected to error correction encoding and input to the CDMA signal processing unit 6.

The CDMA signal processing unit 6 first performs spread spectrum processing for the input transmission data. This spread spectrum processing is done by multiplying the transmission data by a PN code assigned to the transmitting channel. Digital modulation is then performed for the spread transmission data. QPSK is an example of this digital modulation. The transmission signal generated by the digital modulation is input to a transmitting circuit (TX) 5.

The analog audio circuit 19 performs analog modulation of a carrier signal by using the input analog transmission speech signal. FM modulation is an example of this analog modulation system. The modulated carrier signal is input to the transmitting circuit (TX) 5.

The transmitting circuit 5 synthesizes the input orthogonal modulated signal or carrier signal with a transmit local oscillator signal generated by the frequency synthesizer 4, thereby converting the signal into a radio-frequency signal. On the basis of the transmission data rate notified by the controller 12, the transmitting circuit 5 performs high-frequency amplification only for an effective portion of the radio-frequency signal, and outputs as a transmission radio-frequency signal. The transmission radio-frequency signal output from this transmitting circuit 5 is supplied to the antenna 1 via the antenna duplexer 2. The antenna 1 transmits the signal toward a base station (not shown) by burst transmission.

An input unit 14 has dial keys, a transmission key, a power key, an end key, volume control keys, a mode designating key, and the like. The display 15 has an LCD and LEDs. The LCD displays, e.g., stored information of a telephone directory, a log of incoming and outgoing calls, and the telephone number and operating state of a terminal apparatus of the communication partner. The LEDs are used to inform the user of an incoming call and warn the user when a battery 16 requires charging.

A power circuit 17 generates a predetermined operating power supply voltage Vcc on the basis of the output from the battery 16. This power circuit 17 also has a charging circuit which charges the battery 16.

The controller 12 includes, e.g., a microcomputer as a main control unit. The controller 12 also includes a communication control section which makes speech communication or data communication possible by executing radio connection control in accordance with an outgoing call or incoming call, a position registration control section, and an idle handoff control section. In addition, as control sections according to the present invention, the controller 12 includes a system selection control section (not shown), a first system reselection control section 12*a*, and a second system reselection control section 12*b*. These functions are implemented by making the microcomputer execute programs.

When the terminal apparatus is powered on, the system selection control section selects a system having a high priority order of selection in accordance with a list registered beforehand. The system selection control section acquires a base station which belongs to the selected system, establishes synchronization with this acquired base station, and proceeds to a standby state. This standby state will be referred to as a first standby state hereinafter.

In this first standby state, the first system reselection control section 12*a* detects the received field strength (RSSI) and Ec/Io of a reception signal coming from the base station of the system which has established synchronization. The first system reselection control section 12*a* compares the detected RSSI and Ec/Io with threshold values Ar and Ae, respectively, thereby monitoring the reception quality of the reception signal. This reception quality monitoring is performed for each slot of the reception signal. If the reception quality continuously deteriorates over a predetermined number of slots (e.g., four slots) or more, the first system reselection control section 12*a* executes a first system reselecting process. This first system reselecting process selects a system regardless of the priority order of selection of each system. That is, if a system having high reception quality exists among systems having low priority orders of selection, the first system reselection control section 12*a* selects this system, establishes synchronization, and proceeds to a standby state. This standby state will be referred to as a second standby state hereinafter.

In this second standby state, the second system reselection control section 12*b* detects the received field strength (RSSI) and Ec/Io of a signal coming from the base station of each system except for the system which has established synchronization. This detection is periodically performed at a predetermined interval (e.g., 3 minutes). The second system reselection control section 12*b* compares the detected RSSI and Ec/Io with threshold values Br and Be, respectively, thereby determining the presence/absence of a system having high reception quality. If a system having a higher priority order of selection and higher reception quality than the system which has established synchronization is found, the second system reselection control section 12*b* establishes synchronization with this system and proceeds to a standby state. This standby state is the first standby state described above.

The operation of system selection performed by the mobile communication terminal apparatus configured as above will be explained below.

Assume, for example, that the user turns on the power supply when the mobile communication terminal apparatus MS is in the position shown in FIG. 1. The mobile communication terminal apparatus MS initializes the individual circuits and, under the control of the controller 12, starts system selection control as follows. FIG. 3 is a flowchart showing the procedure and contents of the control.

That is, in step 3*a*, the controller 12 selects a system having the highest priority order of selection on the basis of a system list registered beforehand. In step 3*b*, the controller 12 performs control for establishing synchronization with a base station which belongs to this selected system. For example, assume that the system having the highest priority order of selection is the CDMA portable communication system SI. In this case, the controller 12 selects this CDMA portable communication system SI. The controller 12 then acquires the nearest base station BSS1 from base stations which belong to the selected system SI. Subsequently, the controller 12 executes control for establishing synchronization with this acquired base station. When synchronization is established, the controller 12 proceeds to the first standby state shown in step 3*c*.

Figure 4:
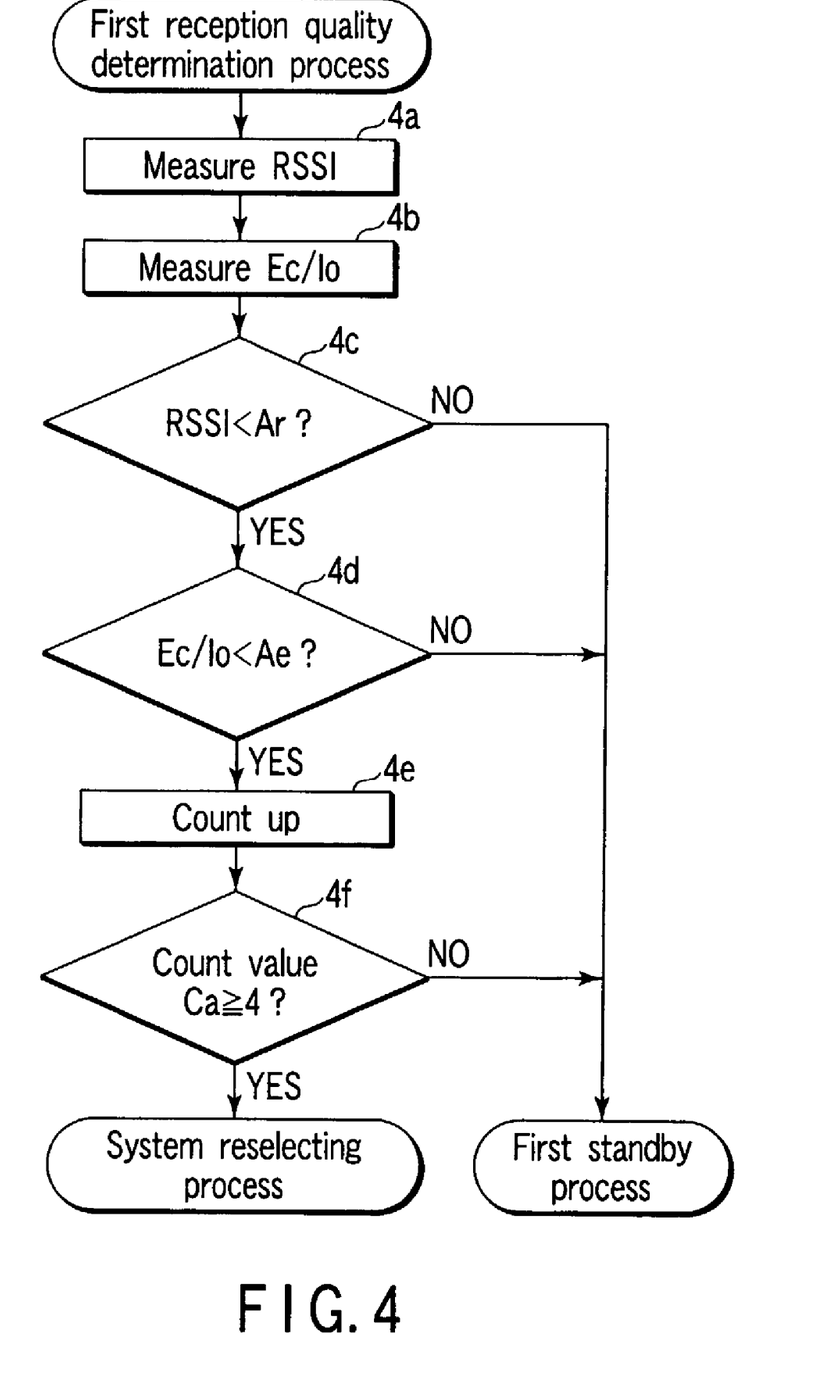
FIG. 4 is a flowchart showing the procedure and contents of first system reselection control.

After proceeding to the first standby state, in step 3*d* the controller 12 executes reception quality determination for the first system reselecting process. FIG. 4 is a flowchart showing the procedure and contents of the determination.

That is, for each slot of a signal coming from the base station BSS1 which has established synchronization, the controller 12 detects the received field strength (RSSI) and Ec/Io of the signal in steps 4*a* and 4*b*, respectively. Ec/Io is the ratio of the energy (Ec) of the signal coming from the base station BSS1 as an object of measurement to the total energy (Io) of received signals. The controller 12 compares the detected RSSI and Ec/Io with the threshold values Ar and Ae in steps 4*c* and 4*d*, respectively, thereby determining whether the reception quality has deteriorated.

Assume that the determination result indicates that both the RSSI and Ec/Io are smaller than the threshold values Ar and Ae, respectively. Accordingly, in step 4*e* the controller 12 counts up a value a of a counter for counting the number of slots by which deterioration of the reception quality is found. If the value a of the counter after this count up is equal to or larger than a preset value, e.g., "4", the controller 12 determines that the reception quality of the signal from the base station BSS1 which has established synchronization has deteriorated, and proceeds to the first system reselecting process shown in step 3*e*.

On the other hand, assume that at least one of the RSSI and Ec/Io is larger than the corresponding one of the threshold values Ar and Ae or that the value a of the counter is smaller than "4". In this case, the controller 12 determines that the reception quality of the signal from the base station BBS1 which has established synchronization has not deteriorated or has deteriorated only temporarily, and returns to the first standby state shown in step 3*c*.

After proceeding to the first system reselecting process shown in step 3*e*, the controller 12 searches a plurality of systems registered in the system list for a system having a lower priority order of selection than the system S1 which has established synchronization but having reception quality which is equal to or higher than a predetermined level. If a system meeting the conditions is detected, the controller 12 acquires a base station of the detected system, establishes synchronization with this acquired base station, and proceeds to the second standby state.

Assume, for example, that a system meeting the conditions is the system S3 using AMPS. In this case, the controller 12 selects this AMPS system S3, acquires the base station BSS3 which belongs to the system S3, establishes synchronization with the acquired base station BSS3, and proceeds to the second standby state.

Accordingly, the mobile communication terminal apparatus MS connected to the CDMA portable communication system S1 is not left to stand by with the reception quality deteriorated. The standby state is continued with the AMPS system S3 having higher reception quality than the system S1.

Figure 5:
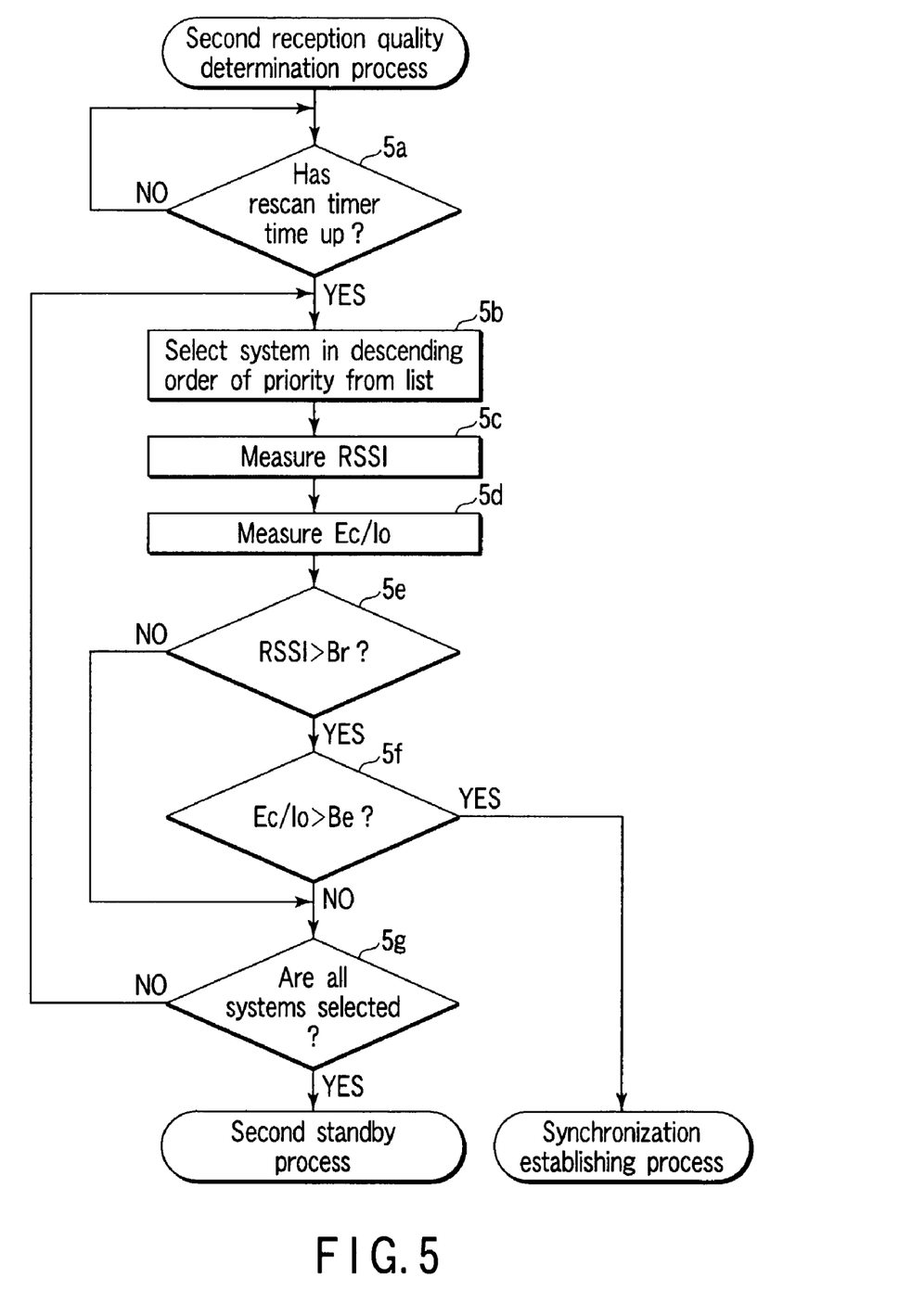
FIG. 5 is a flowchart showing the procedure and contents of second system reselection control.

After proceeding to the second standby state, the controller 12 advances to step 3g to execute reception quality determination for the second system reselecting process. FIG. 5 is a flowchart showing the procedure and contents of the determination.

In step 5a, the controller 12 activates a rescan timer for defining the determination period of the reception quality. The time of this rescan timer is set to, e.g., 3 minutes. If the rescan timer times out, in step 5b the controller 12 selects a system in accordance with the priority order of selection from the system list. In steps 5c and 5d, the controller 12 detects the RSSI and Ec/Io, respectively, of a signal from the base station of the selected system. In steps 5e and 5f, the controller 12 compares the detected RSSI and Ec/Io with the threshold values Br and Be, respectively.

Assume that at least one of the RSSI and Ec/Io is smaller than the corresponding one of the threshold values Br and Be. In this case, the controller 12 returns from step 5g to step 5b to select a system having the second highest priority order of selection and repeat the processes of detecting and determining the RSSI and Ec/Io. If a system in which both the RSSI and Ec/Io exceed the threshold values Br and Be is found, the controller 12 selects this system and returns to step 3b. In step 3b, the controller 12 establishes synchronization with a base station which belongs to the selected system, and proceeds to the first standby state.

Assume, for example, that both the RSSI and Ec/Io of a signal from the base station BSS2 of the PCS system S2 exceed the threshold values Br and Be, respectively. In this case, the controller 12 selects this PCS system S2, establishes synchronization with the nearest base station BSS2 of the system S2, and proceeds to the first standby state. If, for example, the RSSI and Ec/Io of a signal from the base station BSS1 of the CDMA portable communication system S1 exceed the threshold values Br and Be, respectively, the controller 12 reselects this CDMA portable communication system S1 and establishes synchronization. That is, the destination of synchronization establishment of the mobile communication terminal apparatus MS in this case returns to the CDMA portable communication system S1 which is selected when the power supply is turned on and has the highest priority order of selection.

Accordingly, if in the second standby state a system whose reception quality is higher than a reference value is found among systems having higher priority orders of selection than the system which has established synchronization, the destination of synchronization establishment is again automatically changed to this detected system. This avoids the inconvenience that the standby state continues for long periods with respect to the AMPS system S3 having a low priority order of selection.

Assume that when, of all the systems registered in the system list, the reception quality of each system having a higher priority order of selection than the AMPS system S3 which has established synchronization is checked, no system in which both the RSSI and Ec/Io exceed the threshold values Br and Be, respectively, is found. If this is the case, the controller 12 returns from step 5g to step 3f to continue the second standby state. Whenever the rescan timer times out, the controller 12 performs the second system reselection control described above.

The threshold values Br and Be used in the second system reselecting process are set to be larger than the threshold values Ar and Ae, respectively, used in the first system reselecting process. Therefore, the AMPS system S3 is changed to the CDMA system S1 or S2 again only when the reception quality of each system as the destination of the change is sufficiently high. This prevents "ping-pong" system selection in which the destination of synchronization establishment of the mobile communication terminal apparatus MS changes frequently between the AMPS system S3 and the CDMA system S1 or S2.

In the first embodiment described above, while the first standby operation is performed for a system selected from the system list in accordance with power-on, the first reselection control section 12a checks the reception quality (RSSI and Ec/Io) of a signal from the system S3 which has established synchronization. If it detects that the reception quality has deteriorated below the threshold values a plurality of times, the system reselection control section 12a executes a system reselecting process which gives importance to the reception quality rather than to the priority orders of selection defined in the system list.

Accordingly, even in a situation in which handoff between base stations in a system cannot be performed in the first standby state, the destination of synchronization establishment can be automatically changed to the other system S3 having relatively high reception quality. Since this enables a rapid escape from the deteriorated reception quality state, radio connection control for an outgoing call and incoming call can be reliably performed. That is, the connection completion ratio improves.

In the first embodiment, in the second standby state in which a system as the destination of synchronization establishment is changed by the first system reselection control section 12a, the second system reselection control section 12b monitors the reception quality of a system having a higher priority order of selection than the AMPS system S3 which has established synchronization in this second standby state. If a system S2 or S1 whose reception quality exceeds the threshold values is detected, the destination of synchronization establishment is changed to this detected system S2 or S1 again.

Accordingly, even when the destination of synchronization establishment in the standby state is temporarily changed to a system such as the AMPS system S3 having a low priority order of selection, if a system such as the CDMA system S1 having a higher priority order of selection than the system after the change and having reception quality higher than a reference value is detected, the destination of synchronization establishment is again automatically changed to this CDMA system S1. If the reception quality of the CDMA system S1 recovers, the destination of synchronization establishment is automatically returned to this CDMA system S1 having the highest priority order of selection. Hence, the mobile communication terminal apparatus MS can stand by in a system having the highest priority order of selection while maintaining the reception quality.

In the first embodiment as described previously, the threshold values Br and Be used in the second system reselection control are set to be larger than the threshold values Ar and Ae, respectively, used in the first system reselection control. This can prevent the destination of synchronization establishment of the mobile communication terminal apparatus MS in the standby state from pingponging, between a system having a high priority order of selection such as a CDMA portable communication system or a PCS system and a system having a low priority order of selection such as an AMPS system. This increases the stability of the standby state of the mobile communication terminal apparatus MS. Also, since the system reselecting process is not frequently performed, it is possible to reduce the power consumption of the mobile communication terminal apparatus MS and so extend the battery life of the terminal apparatus.

Furthermore, in the first system reselection control, the reception quality of a signal from the CDMA system S1 which has established synchronization is checked for each slot. System reselection is executed if this reception quality continuously deteriorates below the threshold values over a predetermined number (e.g., four) of slots. Therefore, the system reselecting operation is not easily activated by temporary deterioration of the reception quality caused by, e.g., fading. This realizes a highly stable and highly effective system reselecting operation.

(Second Embodiment)

Figure 6:
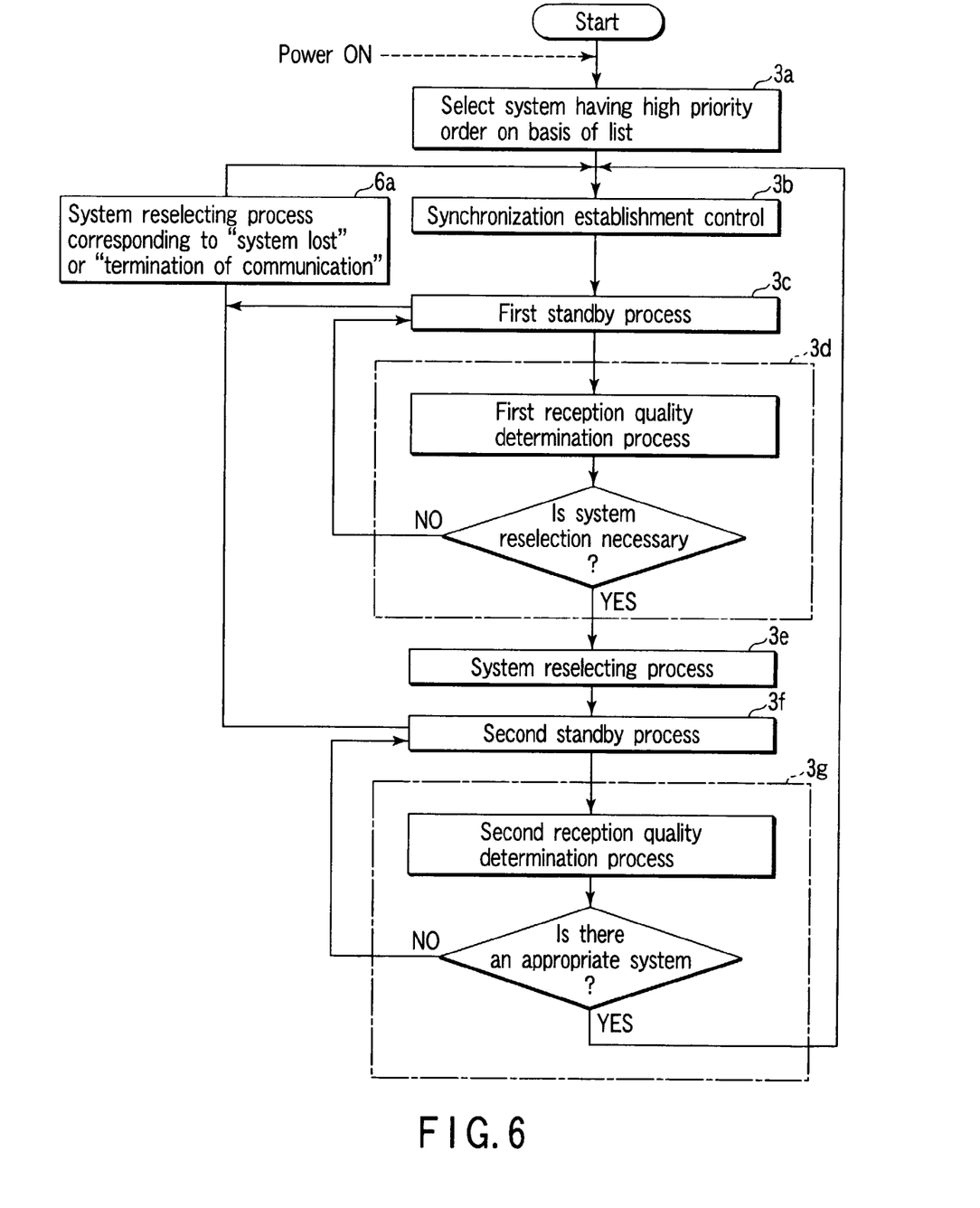
FIG. 6 is a flowchart showing the procedure and contents of system selection control performed by a mobile communication terminal apparatus according to a second embodiment of the present invention.

As shown in FIG. 6, while first system reselection control and second system reselection control are performed in a first standby state (step 3c) and a second standby state (step 3f), respectively, an event which can be a trigger of a system reselecting process is monitored in step 6a. Examples of an event which can be a trigger are "system lost" in the standby state and the termination of communication. The any of these events is detected, a system reselecting process is executed. "System lost" in the standby state is the inability to receive any effective messages in succession for 3 seconds or more in a paging channel receiving period except for a sleep period of an intermittent receiving operation.

(Third Embodiment)

In the first embodiment, if a system in which both the RSSI and Ec/Io exceed the threshold values Br and Be is detected even once during the second system reselection control, the destination of synchronization establishment is again immediately changed to this detected system. However, as in the first system reselection control, when a system in which both the RSSI and Ec/Io exceed the threshold values Br and Be a plurality of times in succession is found, the destination of synchronization establishment can again be changed to the detected system.

Figure 7:
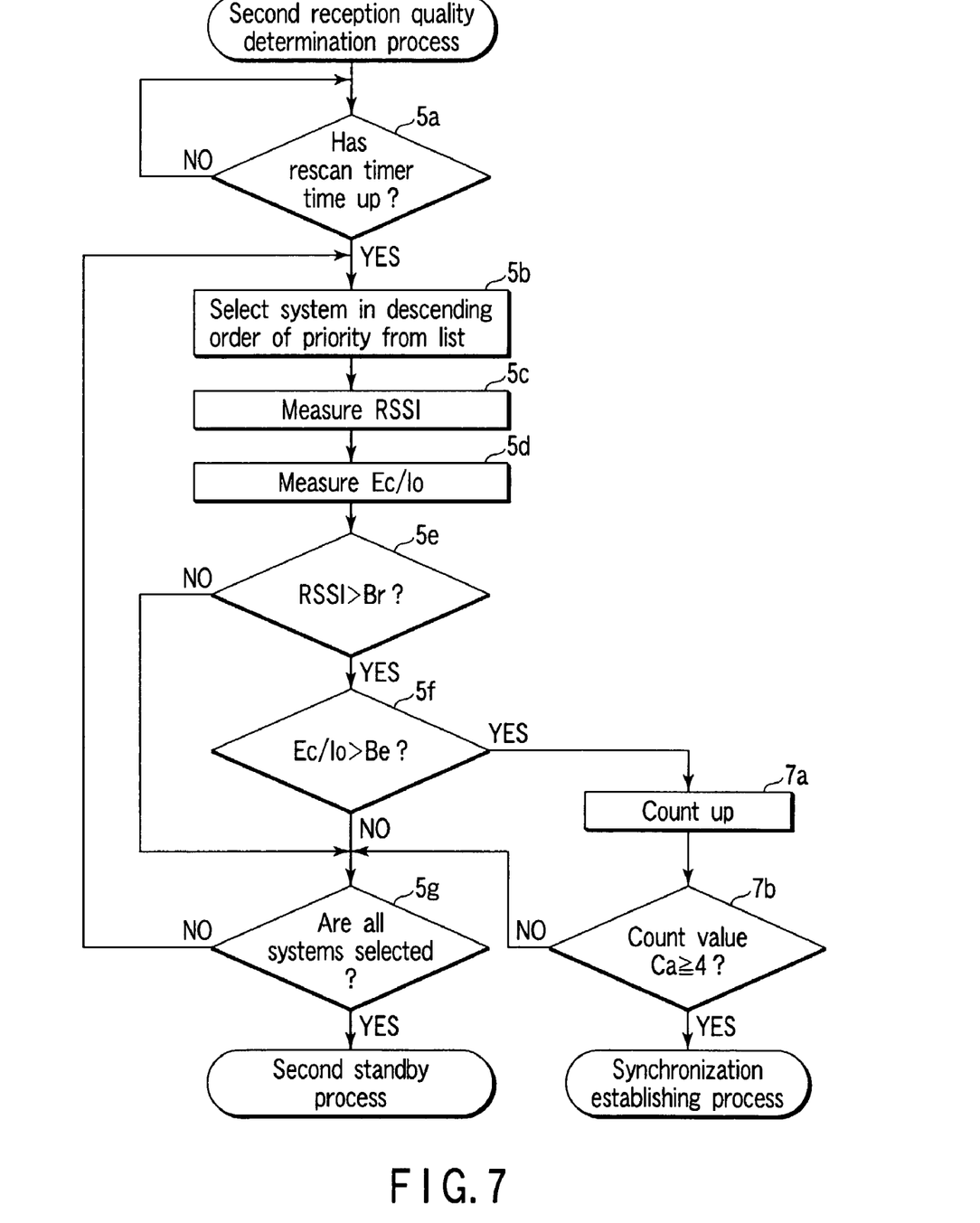
FIG. 7 is a flowchart showing the procedure and contents of system selection control performed by a mobile communication terminal apparatus according to a third embodiment of the present invention.

FIG. 7 is a flowchart showing the procedure and contents of second system reselection control performed by a mobile communication terminal apparatus according to this third embodiment. The same reference symbols as in FIG. 5 denote the same steps in FIG. 7, and a detailed description thereof will be omitted.

Assume that a system in which both the RSSI and Ec/Io exceed the threshold values Br and Be in steps 5e and 5f, respectively, is found. In this case, in step 7a a controller 12 counts up a value b of a counter for counting the number of times of improvement of the reception quality. If this value b of the counter after the count up is smaller than N, the controller 12 determines that the reception quality of the system is still unstable, and the flow returns from step 5g to step 5c. The controller 12 then selects a system having the second highest priority order of selection, and repeats the processes of detecting and checking the RSSI and Ec/Io.

If the value b of the counter after the count up exceeds the preset value N, the controller 12 determines that a system having stably improved reception quality has been found. So, the flow returns to step 3b, and the controller 12 establishes synchronization with this system and proceeds to the first standby state.

Since, therefore, a system in which the reception quality is temporarily improved is not immediately selected, a highly stable system selecting operation can be realized. Note that the value of N can be any arbitrary number selected from one or more values in accordance with the required system selection stability.

The present invention is not limited to the above embodiments. For example, it is possible to modify, without departing from the gist of the invention, the types and number of systems to be reselected, the method of setting the priority order of selection of each system, the procedures and contents of the first and second system reselection control operations, the procedures and contents of detection and determination of the reception quality, and the types and arrangements of mobile communication terminal apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A mobile terminal for connecting to a plurality of mobile communication systems having different communication standards, comprising:

a system acquiring section configured to acquire a first system from the plurality of mobile communication systems, and proceed to a standby state;

a first determination section configured to detect a first reception quality of a signal transmitted from the first system, and check whether the detected first reception quality satisfies a first condition;

a first reacquiring section configured to acquire from a plurality of mobile communication systems a second system having a second reception quality that satisfies a second condition if the first determination section determines that the detected first reception quality does not satisfy the first condition, and proceed to a standby state;

a second determination section configured to detect a reception quality of a signal transmitted from a system other than the second system, and check whether there is a third system whose reception quality satisfies a third condition; and a second reacquiring section configured to acquire the third system satisfying the third condition if the second determination section determines that there is the third system whose reception quality satisfies the third condition, and proceed to a standby state, wherein the second system reacquiring section acquires the first system if the third system satisfying the third condition includes the first system.

2. A mobile terminal for connecting to a plurality of mobile communication systems having different standards, comprising:
- a memory configured to store priority information corresponding to the plurality of mobile communication systems;
- a system acquiring section configured to select a first system from the plurality of mobile communication systems based on the priority information stored in the memory, acquire a base station belonging to the first system, and proceed to a standby state;
- a first determination section configured to detect a first reception quality of a signal from the acquired base station belonging to the first system, and check whether the first reception quality satisfies a first condition;
- a detection section configured to detect a reception quality of a signal from a base station belonging to a system, other than the first system, of the plurality of mobile communication systems;
- a first reacquiring section configured to select from the mobile communication systems other than the first system a second system having a second reception quality higher than the first reception quality if the first determination section determines that the first reception quality does not satisfy the first condition, acquire a base station belonging to the selected second system, and proceed to a standby state;
- a second determination section configured to detect a third reception quality of a signal from a base station belonging to a system other than the second system and check whether the third reception quality satisfies a second condition;
- a third determination section configured to detect a third system having higher priority information than the second system, based on the priority information stored in the memory, and satisfying the second condition; and
- a second reacquiring section configured to acquire a base station belonging to the third system if the third determination section detects that there is the third system, and proceed to a standby state,
- wherein the first determination section detects the reception quality of the signal from the acquired base station belonging to the first system a plurality of times, and checks whether the detected reception quality fails to satisfy the first condition a given number of times, and
- wherein the first reacquiring section selects the second system if the first determination section determines that the detected reception quality fails to satisfy the first condition the given number of times.

3. A mobile terminal for connecting to a plurality of mobile communication systems having different standards, comprising:
- a memory configured to store priority information corresponding to the plurality of mobile communication systems;
- a system acquiring section configured to select a first system from the plurality of mobile communication systems based on the priority information stored in the memory, acquire a base station belonging to the first system, and proceed to a standby state;
- a first determination section configured to detect a first reception quality of a signal from the acquired base station belonging to the first system, and check whether the first reception quality satisfies a first condition;
- a detection section configured to detect a reception quality of a signal from a base station belonging to a system, other than the first system, of the plurality of mobile communication systems;
- a first reacquiring section configured to select from the mobile communication systems other than the first system a second system having a second reception quality higher than the first reception quality if the first determination section determines that the first reception quality does not satisfy the first condition, acquire a base station belonging to the selected second system, and proceed to a standby state;
- a second determination section configured to detect a third reception quality of a signal from a base station belonging to a system other than the second system and check whether the third reception quality satisfies a second condition;
- a third determination section configured to detect a third system having higher priority information than the second system, based on the priority information stored in the memory, and satisfying the second condition; and
- a second reacquiring section configured to acquire a base station belonging to the third system if the third determination section detects that there is the third system, and proceed to a standby state,
- wherein the second determination section detects, a plurality of times, the reception quality of the signal from the base station belonging to the system other than the second system, and checks whether the third reception quality satisfies the second condition a given number of times.

4. In a mobile terminal for connecting to a plurality of mobile communication systems having different communication standards, a system selecting method comprising:
- acquiring a first system from the plurality of mobile communication systems, and proceeding to a standby state;
- detecting a first reception quality of a signal transmitted from the first system;
- checking whether the first reception quality satisfies a first condition;
- acquiring from the plurality of mobile communication systems a second system having a second reception quality satisfying a second condition if the first reception quality does not satisfy the first condition, and proceeding to a standby state;
- detecting a reception quality of a signal transmitted from a system other than the second system to check whether there is a third system whose reception quality satisfies a third condition;
- acquiring the third system satisfying the third condition if there is the third system whose reception quality satisfies the third condition, and proceeding to a standby state; and
- checking whether the third system satisfying the third condition includes the first system, and acquiring the first system if the third system includes the first system.

* * * * *